Jan. 24, 1967 C. T. LAWSON 3,300,143
NOZZLE FOR WINDSHIELD CLEARING SYSTEM
Filed Feb. 3, 1965
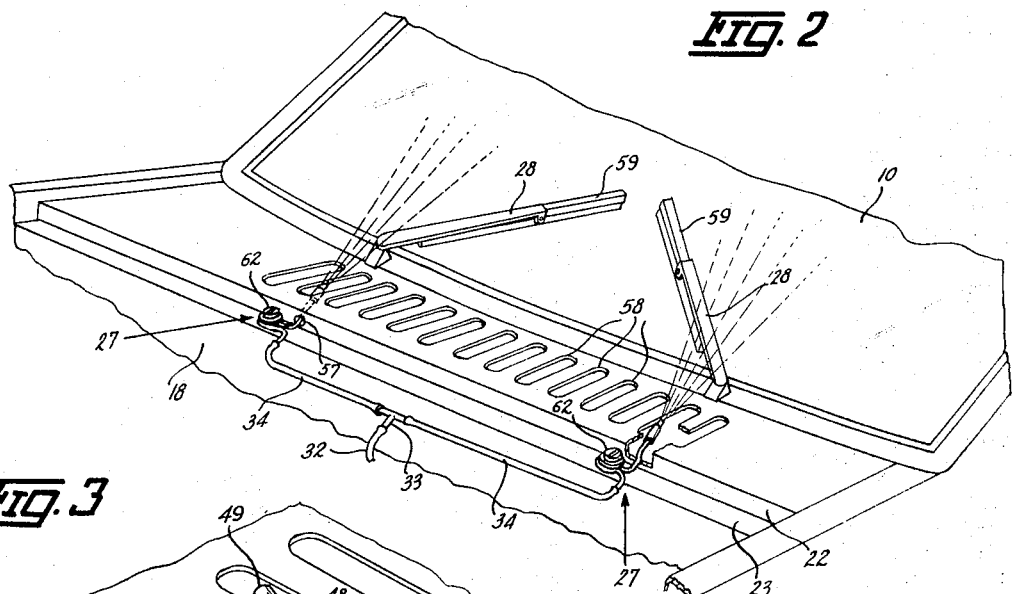
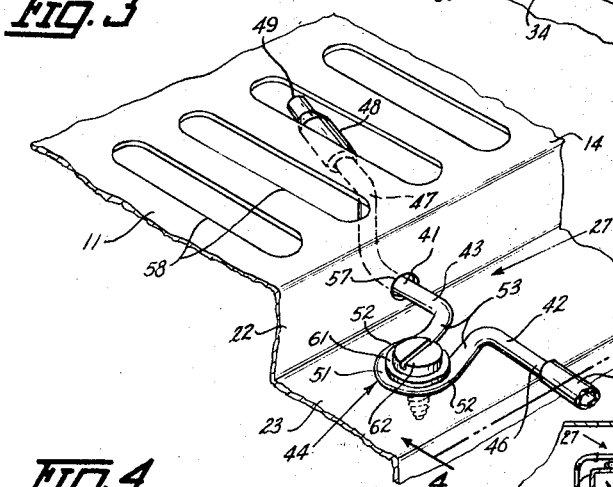
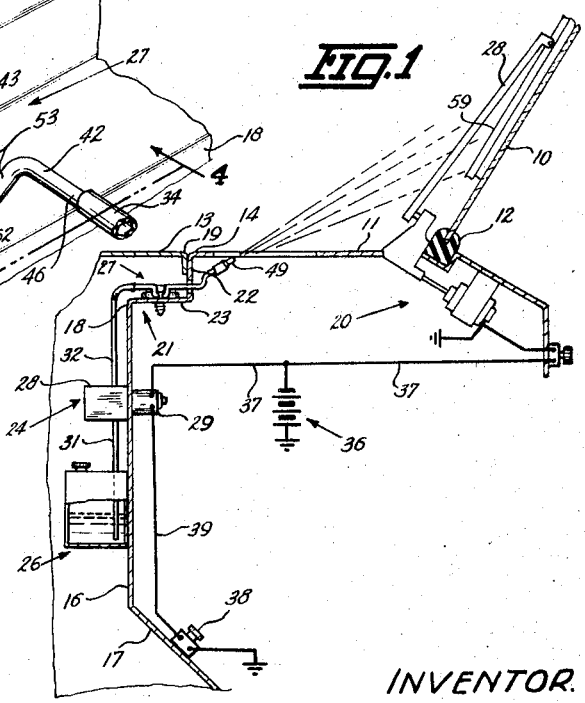
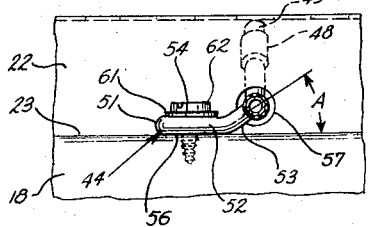
INVENTOR.
CHARLES T. LAWSON
BY Rudolph L. Lovell
ATTORNEY.

United States Patent Office 3,300,143
Patented Jan. 24, 1967

3,300,143
NOZZLE FOR WINDSHIELD CLEARING SYSTEM
Charles T. Lawson, Cookeville, Tenn., assignor, by mesne assignments, to The Delman Company, a corporation of Tennessee
Filed Feb. 3, 1965, Ser. No. 430,070
2 Claims. (239—284)

This invention relates generally to automobile windshield clearing systems and more particularly to a nozzle unit in such a system for directing a stream of fluid onto the windshield.

An object of this invention is to provide an improved nozzle unit.

Another object of the invention is to provide a one-piece combination nozzle and bracket unit for an automobile windshield clearing system which is readily mounted on the vehicle cowl and adjustable for directing a jet of cleansing fluid ont the windshield into the path of the windshield wiper blade.

A further object is to provide a nozzle and mounting bracket unit of a one-piece construction which is economical to manufacture and simple to install.

Further objects, features and advantages of this invention will become apparent from the following description when taken in connection with the accompanying drawing in which:

FIG. 1 is a fragmentary longitudinal sectional view of an automobile showing a windshield clearing system embodying the nozzle unit of this invention;

FIG. 2 is a fragmentary perspective view of a vehicle windshield and cowl assembly showing the nozzle units installed on the automobile, with parts broken away for the purpose of clarity;

FIG. 3 is an enlarged fragmentary perspective view of a nozzle unit installed on the automobile; and FIG. 4 is an elevational view taken along the line 4—4 in FIG. 3.

With reference to the drawings there is illustrated in FIG. 1 a windshield clearing system as applied to an automobile having a windshield 10, an engine cowl 11 extended forwardly from the lower front edge 12 of the windshield 10, and an engine hood 13 positioned forwardly of the front end 14 of the cowl 11. The automobile is further equipped with the usual fire wall 16 and an upwardly and forwardly inclined floor board section 17 which joins the lower end of the fire wall 16.

The front end 14 of the cowl and the upper end 18 of the fire wall 16 which terminates at a position below and forwardly of the rear end 19 of the hood 13 (FIG. 1) are joined by a step unit 21 which comprises a flange 22 depending from the front end 14 of the cowl and a shoulder or ledge portion 23 which extends forwardly from the bottom of the flange 22 to the upper end 18 of the fire wall 16.

The windshield clearing system includes a pump assembly 24 (FIG. 1) and an associated fluid reservoir or container 26 both of which are supported on the fire wall 16. The reservoir 26 carries fluid for a pair of identical nozzles or fluid discharge units 27 which are secured to the step unit 21 at a position generally forwardly of the windshield wiper arms 28.

The pump assembly 24 includes a gear type pump 28 and an electric motor 29 therefor, with the pump inlet being connected to the reservoir 26 through a fluid line 31. The outlet of the pump 28 is connected to a discharge line 32 (FIG. 2) connected to one end of a T-connection 33, the other two ends of which are connected through fluid lines 34 to the nozzle units 27.

The pump motor 29 is connected to a battery 36 through an electrical conductor 37 (FIG. 1). A foot operated switch 38 interposed in an electrical conductor 39 between the motor 29 and the ground is mounted on the floor board 17. On actuation of the switch 39 to energize the motor 29 fluid is drawn by the pump 28 from the reservoir 26 through the fluid line 31 for discharge through the fluid lines 32 and 34 and the nozzle units 27 onto the windshield 10.

As shown in FIG. 3 each nozzle unit 27 consists of a one-piece tubular body member 41 of an irregular configuration having axially aligned linear sections 42 and 43 connected at the adjacent inner ends thereof to a laterally extended bracket section 44. The opposite end of the aligned section 42 constitutes an inlet portion 46 which is connected to a fluid line 34. The aligned section 43 is connected at its opposite end to a discharge section 47 which terminates in an outlet end 48 having a fluid dispensing cap 49 connected thereto. The discharge section 47 is inclined upwardly and rearwardly relative to the section 43.

The bracket section 44 includes a U-shape support base 51 having legs 52 integrally formed with parallel extensions 53 that are inclined upwardly at an angle A relative to the support base 51 (FIG. 4). The extensions 53 are joined to the corresponding inner adjacent ends of the aligned sections 42 and 43 and support the discharge section 47 and aligned sections 42 and 43 at a level above the support base 51 and in turn above the ledge 23. It is seen therefore that the upper and lower surfaces 54 and 56 of the support base 51 lie in parallel planes which are also parallel to a horizontal plane extended through the axes of the aligned sections 42 and 43.

In the assembly of a nozzle unit 27 on an automobile the discharge section 47 is initially inserted through an opening 57 formed in the flange 22 with the fluid dispensing cap 49 located within a ventilating and heater air intake opening 58 (FIGS. 2 and 3). The lower surface 56 of the support base 51 is then placed on the ledge 23 so that a mounting hole (not shown) in the ledge 23 is located between the legs 52 of the base 51. A washer 61 is then placed on the upper surface 54 of the base and a metal screw 62 is inserted therethrough and into the mounting hole for fastening to the ledge 23 in a conventional manner whereby to clamp the base 51 securely against the ledge 23.

By virtue of the parallel relation of the base surfaces 54 and 56 a full and flush bearing engagement takes place between the washer 61 and the surface 54, and between the surface 56 and the ledge 23 so as to rigidly support a nozzle unit 27. This rigid support must be maintained for a nozzle position such that fluid is directed from the dispensing cap 49 against that part of the windshield 10 which is in the path of a windshield blade 59. Directional adjustment of a nozzle unit 27 is thus essential. An assembled nozzle unit 27 can be adjusted by merely loosening the screw 62, and then moving the support base 51 laterally within the space between the legs 52 and/or rotatably about the screw 62 in a supported position on the ledge 23.

Although the invention has been described with respect to a preferred embodiment thereof it is to be understood that it is not to be so limited since changes can be made therein which are within the full intended scope of this invention as defined in the appended claims.

I claim:
1. A fluid discharge nozzle unit for use in a windshield clearing system for an automobile having a windshield and a ledge portion located forwardly thereof, comprising:
   (a) a one-piece tubular body member having a pair of axially aligned sections and a laterally extended bracket section located between the inner adjacent ends of said aligned sections,

(b) said bracket section including a base portion of a U-shape having the legs thereof terminating in laterally inclined parallel extensions joined with corresponding ones of the inner adjacent ends of said aligned sections, (c) the outer end of one of said aligned sections terminating in a discharge portion, and the outer end of the other one of said aligned sections terminating in an inlet portion, (d) said base portion located in a plane parallel to a plane extended through the axes of said aligned sections, and (e) means extended between and engageable with the legs of said base portion and attachable to said ledge for securing the nozzle unit to said ledge.

2. A nozzle unit for use in a windshield clearing system for an automobile having a windshield and a ledge located forwardly thereof, comprising:

(a) an elongated tubular body member having a fluid passage extended therethrough, said body member having a pair of spaced axially aligned sections secured at the inner adjacent ends thereof to a laterally extended bracket section, the other end of one aligned section connected to a fluid inlet line, and the other end of the second aligned section secured to a discharge section, (b) said bracket section including a support base of a U-shape having the legs thereof terminating in laterally inclined extensions joined with corresponding ones of the inner adjacent ends of said aligned sections, (c) said support base having top and bottom surfaces parallel to a plane extended through the axes of said aligned sections, and (d) means extended between and engageable with the legs of said support base to secure said support base to said ledge whereby to support said discharge section and aligned sections above said ledge.

No references cited.

EVON C. BLUNK, *Primary Examiner.*

V. WIGMAN, *Assistant Examiner.*